US011207775B2

(12) United States Patent
Shibata et al.

(10) Patent No.: US 11,207,775 B2
(45) Date of Patent: Dec. 28, 2021

(54) METHOD OF TEACHING ROBOT

(71) Applicants: KAWASAKI JUKOGYO KABUSHIKI KAISHA, Kobe (JP); KAWASAKI ROBOTICS (USA), INC., Wixom, MI (US)

(72) Inventors: Takeshi Shibata, Akashi (JP); Yukimasa Yamada, Himeji (JP); Takao Yamaguchi, Fremont, CA (US); Tomokazu Arita, San Jose, CA (US); Eric Chan, San Francisco, CA (US); Francisco J. Duran, Jr., San Jose, CA (US); Hajime Nakahara, San Jose, CA (US); Avish Ashok Bharwani, Santa Clara, CA (US); Ming Zeng, San Jose, CA (US)

(73) Assignees: KAWASAKI JUKOGYO KABUSHIKI KAISHA, Kobe (JP); KAWASAKI ROBOTICS (USA), INC., Wixom, MI (US)

( * ) Notice: Subject to any disclaimer, the term of this patent is extended or adjusted under 35 U.S.C. 154(b) by 277 days.

(21) Appl. No.: 16/469,184

(22) PCT Filed: Dec. 13, 2017

(86) PCT No.: PCT/JP2017/044740
§ 371 (c)(1),
(2) Date: Jun. 13, 2019

(87) PCT Pub. No.: WO2018/110601
PCT Pub. Date: Jun. 21, 2018

(65) Prior Publication Data
US 2019/0389059 A1 Dec. 26, 2019

Related U.S. Application Data

(60) Provisional application No. 62/433,289, filed on Dec. 13, 2016.

(51) Int. Cl.
*B25J 9/16* (2006.01)

(52) U.S. Cl.
CPC .............. *B25J 9/163* (2013.01); *B25J 9/1664* (2013.01)

(58) Field of Classification Search
CPC ........ B25J 9/163; B25J 9/1656; B25J 9/1664; B25J 11/0095; B25J 15/0061; G05B 19/425; G05B 2219/45031
See application file for complete search history.

(56) References Cited

U.S. PATENT DOCUMENTS

| 2003/0011338 A1* | 1/2003 | Gilchrist | .................. | B25J 18/04 |
| | | | | 318/568.21 |
| 2005/0079042 A1* | 4/2005 | Maeda | .................... | B25J 9/101 |
| | | | | 414/744.2 |

(Continued)

FOREIGN PATENT DOCUMENTS

| CN | 103302657 A | 9/2013 |
| JP | H07-297255 A | 11/1995 |

*Primary Examiner* — Stephen Holwerda
(74) *Attorney, Agent, or Firm* — Oliff PLC

(57) ABSTRACT

A method of teaching a robot, the robot including a first and second end effector that are mounted to a robotic arm wrist, the first and second end effector being rotatable about a same rotational axis independently of each other. The method includes: a first step of, in a state where rotational positions of the first and second end effectors about the rotational axis coincide with each other, attaching a relative motion preventing device to the first and second end effector, the relative motion preventing device preventing the first and second end effector from moving relative to each other; and a fourth step of generating a teaching point of the second end effector based on: a teaching point of the first end effector; and rotational position information about the first and second end effector that are stored in a storage unit in association with each other in a third step.

5 Claims, 9 Drawing Sheets

(56) References Cited

U.S. PATENT DOCUMENTS

| | | | |
|---|---|---|---|
| 2005/0102064 A1* | 5/2005 | Donoso | H01L 21/68707 700/254 |
| 2009/0024241 A1* | 1/2009 | Rice | H01L 21/67766 700/112 |
| 2010/0290886 A1* | 11/2010 | Hashimoto | H01L 21/67742 414/800 |
| 2013/0039726 A1* | 2/2013 | Brodine | H01L 21/67742 414/226.05 |
| 2013/0238127 A1 | 9/2013 | Ohta et al. | |
| 2014/0365011 A1* | 12/2014 | Hosek | B25J 9/1682 700/259 |
| 2015/0332945 A1* | 11/2015 | Furuichi | H01L 21/67706 414/222.12 |
| 2016/0055425 A1* | 2/2016 | Minami | G05B 19/425 706/12 |

\* cited by examiner

METHOD OF TEACHING ROBOT

TECHNICAL FIELD

The present invention relates to a method of teaching a robot.

BACKGROUND ART

Conventionally, there are known robot teaching methods. Such a robot teaching method is applied to, for example, a substrate holding apparatus disclosed in Patent Literature 1.

The substrate holding apparatus of Patent Literature 1 includes: a first hand and a second hand arranged such that they are spaced apart from each other in the vertical direction; a spacing control mechanism configured to control the space between the first hand and the second hand; and a vibration damping mechanism configured to damp vibration of the first and second hands when the space between the first hand and the second hand is controlled. Each of the first hand and the second hand is a U-shaped plate member whose upper surface is provided with support protrusions for holding a substrate.

CITATION LIST

Patent Literature

PTL 1: Japanese Laid-Open Patent Application Publication No. H07-297255

SUMMARY OF INVENTION

Technical Problem

In the substrate holding apparatus disclosed in Patent Literature 1, the first hand and the second hand (which are hereinafter referred to as "the first end effector" and "the second end effector") are configured to rotate about the same rotational axis. Accordingly, if the distance between the first end effector and the second end effector in the vertical direction is known, then by correcting the distance, a teaching point of the first end effector can be used also for the second end effector. Theoretically speaking, the rotational position of the first end effector when the first end effector is operated based on a teaching point of the first end effector, and the rotational position of the second end effector when the second end effector is operated also based on the teaching point of the first end effector, coincide with each other.

However, when the first end effector and the second end effector are operated in the above manner, there is a case where the rotational position of the first end effector and the rotational position of the second end effector shift from each other due to, for example, rattling in the driving mechanism (e.g., gear reduction mechanism) of each of the first end effector and the second end effector. In this case, consequently, the second end effector cannot be operated with high precision.

In view of the above, an object of the present invention is to provide a method of teaching a robot, the method being capable of operating the second end effector with high precision even in a case where a teaching point of the first end effector is used also for operating the second end effector.

Solution to Problem

In order to solve the above-described problems, a method of teaching a robot according to the present invention is a method of teaching a robot that includes: a robotic arm; a first end effector and a second end effector that are mounted to a wrist of the robotic arm, the first end effector and the second end effector being rotatable about a same rotational axis independently of each other; a first driving source and a second driving source, the first driving source being configured to rotate the first end effector about the rotational axis, the second driving source being configured to rotate the second end effector about the rotational axis; a first rotational position detector and a second rotational position detector, the first rotational position detector being configured to detect a rotational position of the first end effector, the second rotational position detector being configured to detect a rotational position of the second end effector; a storage unit configured to store rotational position information about the first end effector and rotational position information about the second end effector, the rotational position information about the first end effector being based on an output from the first rotational position detector, the rotational position information about the second end effector being based on an output from the second rotational position detector; and a robot controller configured to control the robotic arm, the first end effector, the second end effector, the first driving source, the second driving source, and the storage unit. The method includes: a first step of, in a state where the rotational position of the first end effector and the rotational position of the second end effector about the rotational axis coincide with each other, attaching a relative motion preventing device to the first end effector and the second end effector, the relative motion preventing device preventing the first end effector and the second end effector from moving relative to each other; a second step of rotating the first end effector and the second end effector after the first step, with the relative motion preventing device being attached to the first end effector and the second end effector; a third step of, while performing the second step, storing rotational position information about the first end effector for a plurality of rotational positions thereof and rotational position information about the second end effector for rotational positions thereof in the storage unit, the rotational positions of the second end effector corresponding to the plurality of rotational positions of the first end effector, respectively, such that the rotational position information about the first end effector and the rotational position information about the second end effector are stored in the storage unit in association with each other for each of the plurality of rotational positions of the first end effector; and a fourth step of generating a teaching point of the second end effector based on: a teaching point of the first end effector, the teaching point being stored when teaching of the first end effector is performed; and the rotational position information about the first end effector and the rotational position information about the second end effector that are stored in the storage unit in association with each other in the third step.

According to the above configuration, when a teaching point of the first end effector, the teaching point being stored when teaching of the first end effector is performed, is used also for operating the second end effector, the rotational position of the first end effector and the rotational position of the second end effector can be prevented from shifting from each other due to, for example, rattling in the driving mechanism (e.g., gear reducer) of each of the first end effector and the second end effector. This consequently makes it possible to provide the method of teaching a robot, the method being capable of operating the second end effector with high precision even in a case where a teaching point of the first end effector is used also for operating the second end effector.

Generating the teaching point of the second end effector may be performed based on the teaching point of the first end effector by using an approximation equation that is an equation for deriving, from a rotational position of the first end effector, a corresponding rotational position of the second end effector. The approximation equation is created based on the rotational position information about the first end effector and the rotational position information about the second end effector that are stored in the storage unit in association with each other in the third step.

According to the above configuration, in the third step, a plurality of pieces of rotational position information about the first end effector and a plurality of pieces of rotational position information about the second end effector are stored in the storage unit, such that the rotational position information about the first end effector and the rotational position information about the second end effector are stored in the storage unit in association with each other for each of a plurality of rotational positions, and also, rotational position information for a rotational position located between the plurality of rotational positions can be interpolated.

The relative motion preventing device may be configured to hold the first end effector and the second end effector in a sandwiching manner from one side and another side with respect to the rotational axis.

The above configuration makes it possible, with a simple structure, to assuredly prevent the first end effector and the second end effector from moving relative to each other.

For example, the first end effector and the second end effector may have a same contour when seen in a plan view.

For example, the robot may be a transfer robot for holding and transferring a semiconductor wafer in a clean room that is a semiconductor manufacturing site.

Advantageous Effects of Invention

The present invention makes it possible to provide a method of teaching a robot, the method being capable of operating the second end effector with high precision even in a case where a teaching point of the first end effector is used also for operating the second end effector.

The above and other objects, features, and advantages of the present invention will more fully be apparent from the following detailed description of a preferred embodiment with accompanying drawings.

DESCRIPTION OF EMBODIMENTS (Overall Configuration)

Figure 1:
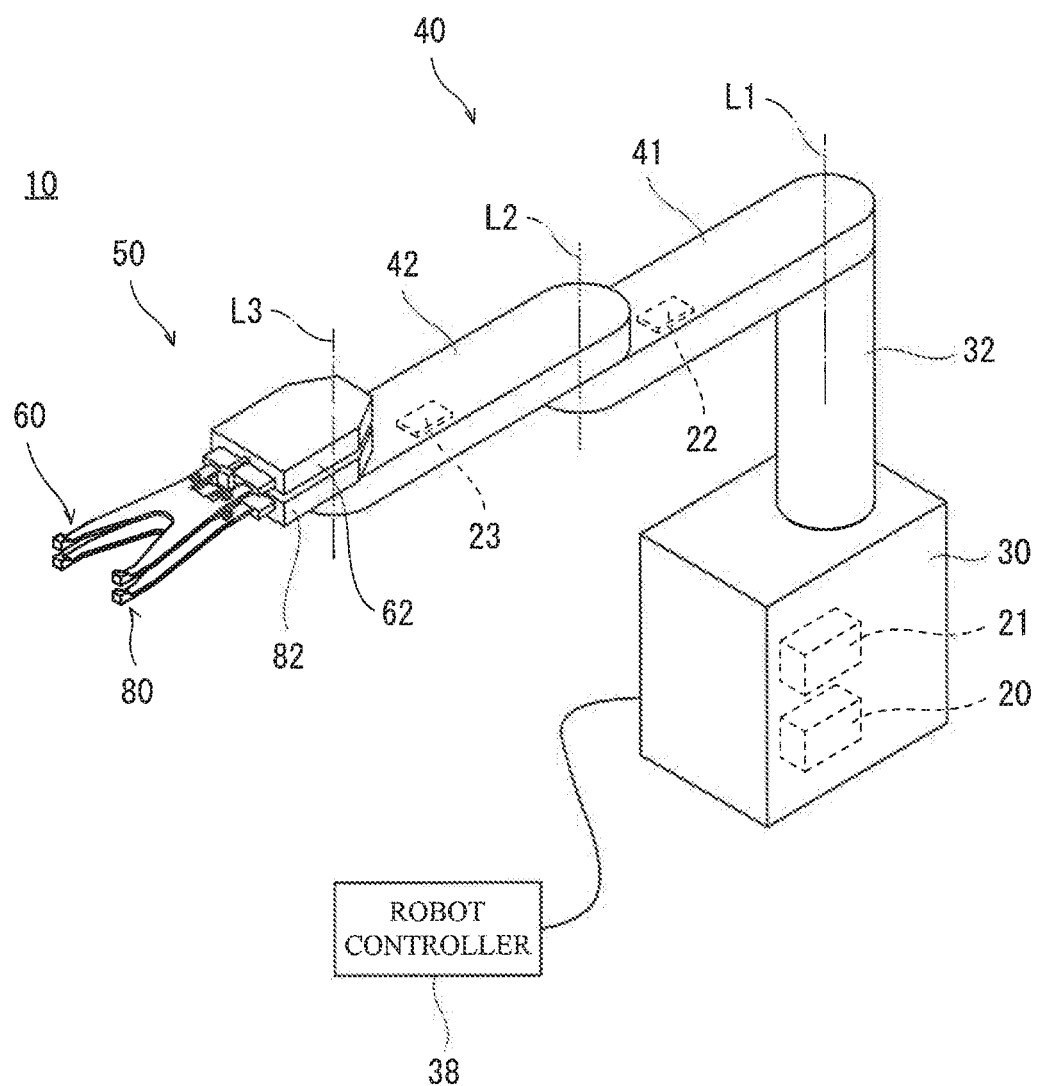
FIG. 1 is a perspective view showing an overall configuration of a robot, the teaching of which is performed by a teaching method according to an embodiment of the present invention.

Hereinafter, a method of teaching a robot according to an embodiment of the present invention is described with reference to the drawings. It should be noted that the present invention is not limited by the present embodiment. In the drawings, the same or corresponding elements are denoted by the same reference signs, and repeating the same descriptions is avoided below.

(Robot 10)

FIG. 1 is a perspective view showing an overall configuration of a robot, the teaching of which is performed by the teaching method according to the present embodiment. A robot 10 in the present embodiment is a transfer robot for holding and transferring a semiconductor wafer W (see FIG. 2 and FIG. 3) in a clean room that is a semiconductor manufacturing site. It should be noted that the semiconductor wafer W is a thin plate used in semiconductor processing, and is defined as a semiconductor device material.

As shown in FIG. 1, the robot 10 is a three-axis robot of a so-called horizontal articulated type. The robot 10 includes: a base 30; a lifting/lowering main shaft 32 provided on the upper surface of the base 30; a robotic arm 40 mounted to the upper end portion of the lifting/lowering main shaft 32; an end effector 50 mounted to the wrist of the robotic arm 40; and a robot controller 38.

(Lifting/Lowering Main Shaft 32 and Robotic Arm 40)

The lifting/lowering main shaft 32 is configured to be extendable/retractable in the vertical direction by means of an unshown air cylinder or the like. A lifting/lowering driving source 20, which is provided inside the base 30, causes the lifting/lowering main shaft 32 to make such lifting/lowering motion. The lifting/lowering main shaft 32 is rotatable relative to the base 30 about a first rotational axis L1 extending in the vertical direction. A first turning driving source 21, which is provided inside the base 30, causes the lifting/lowering main shaft 32 to make the rotational motion. The lifting/lowering driving source 20 and the first turning driving source 21, and also a second turning driving source 22 and a third turning driving source 23, which will be described below, can each be configured as a servomotor. Each of these driving sources can be controlled by the robot controller 38.

The robotic arm 40 includes a first link 41 and a second link 42, each of which is configured as an elongated member extending in the horizontal direction.

One end portion of the first link 41 in the longitudinal direction thereof is mounted to the upper end portion of the lifting/lowering main shaft 32. The first link 41 is lifted/lowered integrally with the lifting/lowering main shaft 32, and rotates integrally with the lifting/lowering main shaft 32 about the first rotational axis.

One end portion of the second link 42 in the longitudinal direction thereof is mounted to the other end portion of the first link 41 in the longitudinal direction thereof, such that the one end portion of the second link 42 is rotatable about a second rotational axis L2 extending in the vertical direction. The second turning driving source 22, which is provided inside the first link 41, causes the second link 42 to make the rotational motion relative to the first link 41.

(End Effector 50)

The end effector 50 is mounted to the other end of the second link 42 in the longitudinal direction thereof (i.e., mounted to the wrist of the robotic arm). The end effector 50 includes a first end effector 60 and a second end effector 80, each of which is independently rotatable about the same third rotational axis L3 (a rotational axis) extending in the vertical direction. In the present embodiment, the second end effector 80 is disposed below the first end effector 60. When seen in a plan view, the first end effector 60 and the second end effector 80 have the same contour.

Figure 2:
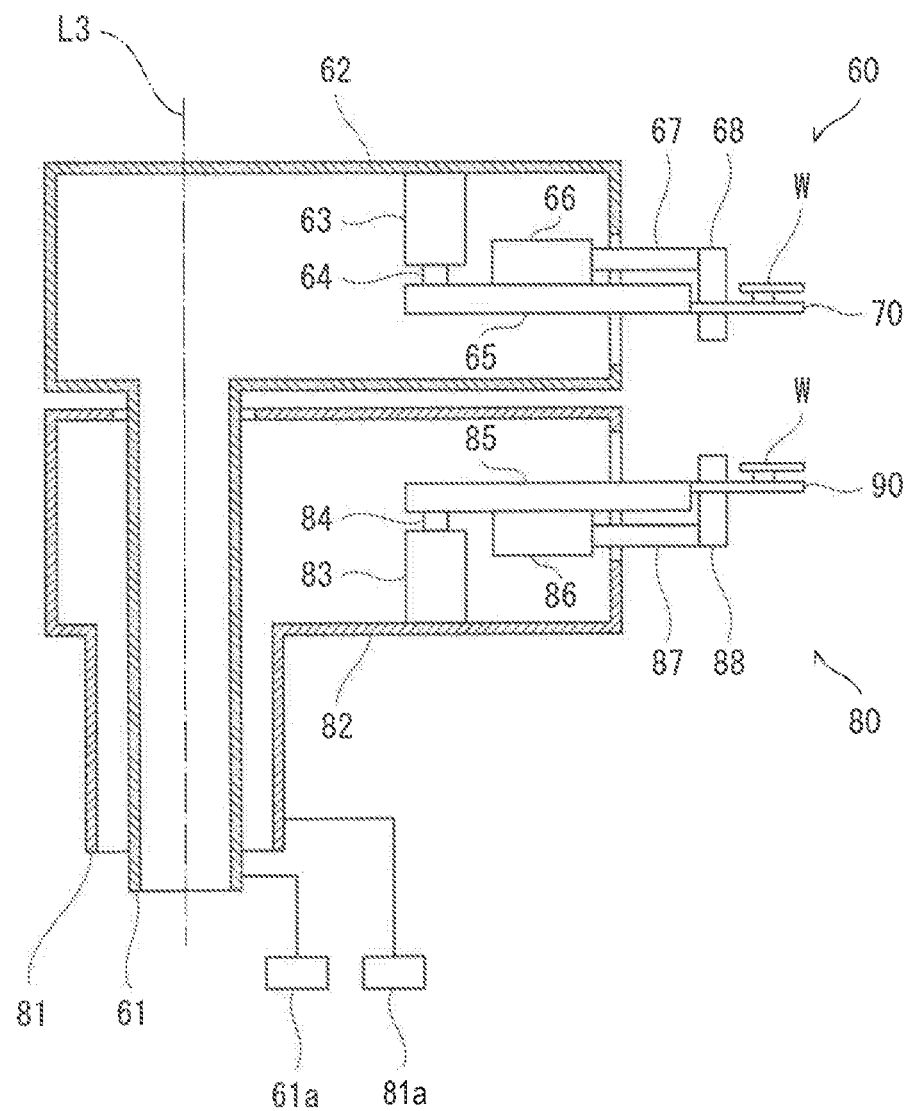
FIG. 2 is a schematic sectional view of the robot, the teaching of which is performed by the teaching method according to the embodiment of the present invention, the robot being in a state where the space between a first end effector and a second end effector in the vertical direction is maximized.
Figure 3:
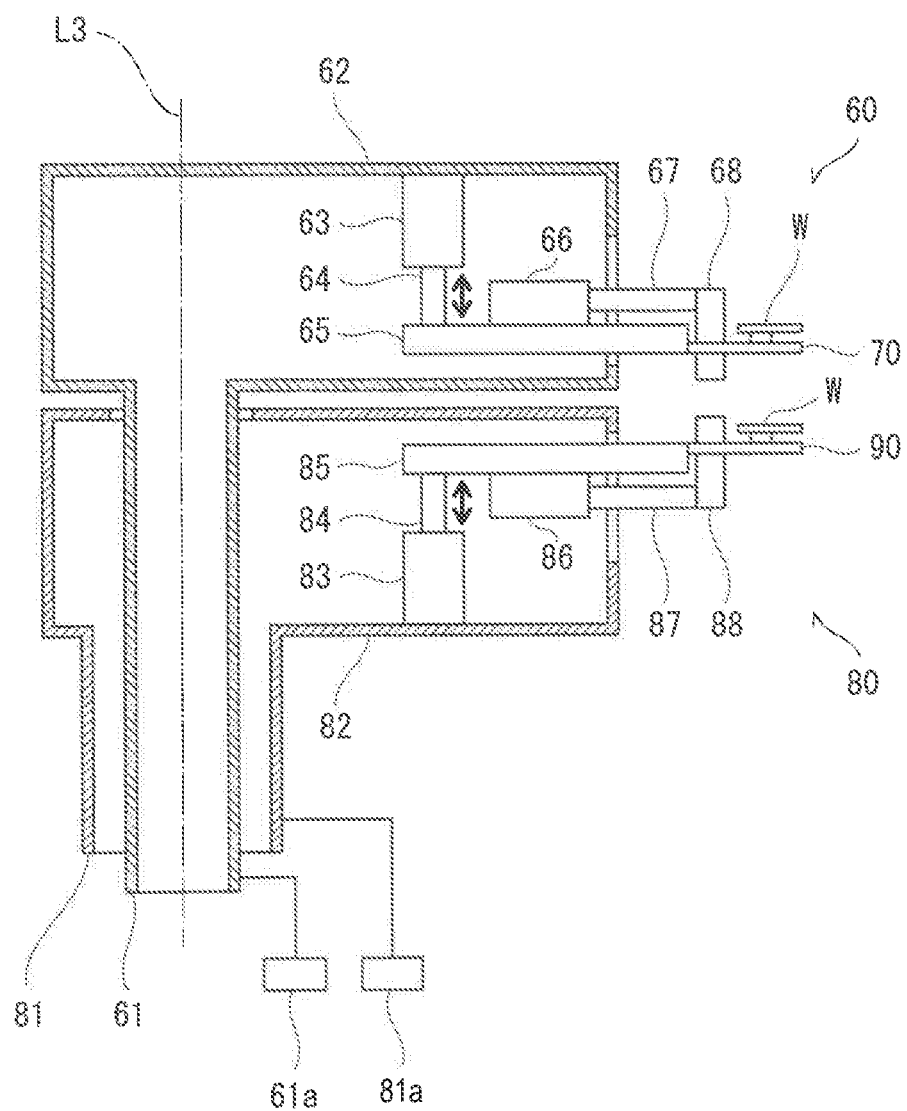
FIG. 3 is a schematic sectional view of the robot, the teaching of which is performed by the teaching method according to the embodiment of the present invention, the robot being in a state where the space between the first end effector and the second end effector in the vertical direction is minimized.

FIG. 2 is a schematic sectional view of the robot, the teaching of which is performed by the teaching method according to the present embodiment, the robot being in a state where the space between the first end effector and the second end effector in the vertical direction is maximized. FIG. 3 is a schematic sectional view of the robot being in a state where the space between the first end effector and the second end effector in the vertical direction is minimized. As shown in FIG. 2 and FIG. 3, the third turning driving source 23, which is provided inside the second link 42, causes the first end effector 60 to make the rotational motion relative to the second link 42, and also causes the second end effector 80 to make the rotational motion relative to the second link 42.

(First End Effector 60)

The first end effector 60 includes: a first wrist shaft 61, which extends in the vertical direction and the center of which coincides with the third rotational axis L3; a first end effector base 62 formed by a hollow member connected to the upper end portion of the first wrist shaft 61; a first lifting/lowering air cylinder 63 suspended from the lower surface of the top plate of the first end effector base 62; a first lifting/lowering piston 64 provided in a manner to protrude from the lower end portion of the first lifting/lowering air cylinder 63; a first lifting/lowering member 65 connected to the lower end portion of the first lifting/lowering piston 64, the first lifting/lowering member 65 extending in the horizontal direction toward the distal end side thereof; a first pressing air cylinder 66 provided on the upper surface of the first lifting/lowering member 65; a first pressing piston 67 provided in a manner to protrude from the distal end portion of the first pressing air cylinder 66; a first movable gripping portion 68 provided at the distal end portion of the first pressing piston 67; and a first blade member 70 connected to the distal end portion of the first lifting/lowering member 65, the first blade member 70 extending in the horizontal direction toward the distal end side thereof.

The first end effector 60 further includes a first driving source 61a configured as, for example, a servomotor. Motive power generated by the first driving source 61a is transmitted to the first wrist shaft 61 via, for example, a gear reduction mechanism. Accordingly, the first end effector 60 is rotatable, independently of the second end effector 80, about the third rotational axis L3 extending in the vertical direction. The first driving source 61a is provided with an unshown first rotational position detector that is configured as, for example, an encoder. The rotational position of the first end effector 60 can be detected by the first rotational position detector.

(Second End Effector 80)

The second end effector 80 includes: a second wrist shaft 81 provided outside the first wrist shaft 61 and configured such that the center of the second wrist shaft 81 coincides with the third rotational axis L3 and the second wrist shaft 81 extends in the vertical direction; a second end effector base 82 formed by a hollow member connected to the upper end portion of the second wrist shaft 81; a second lifting/lowering air cylinder 83 rising from the upper surface of the bottom plate of the second end effector base 82; a second lifting/lowering piston 84 provided in a manner to protrude from the upper end portion of the second lifting/lowering air cylinder 83; a second lifting/lowering member 85 connected to the upper end portion of the second lifting/lowering piston 84, the second lifting/lowering member 85 extending in the horizontal direction toward the distal end side thereof; a second pressing air cylinder 86 provided on the lower surface of the second lifting/lowering member 85; a second pressing piston 87 provided in a manner to protrude from the distal end portion of the second pressing air cylinder 86; a second movable gripping portion 88 provided at the distal end portion of the second pressing piston 87; and a second blade member 90 connected to the distal end portion of the second lifting/lowering member 85, the second blade member 90 extending in the horizontal direction toward the distal end side thereof.

The second end effector 80 further includes a second driving source 81a configured as, for example, a servomotor. Motive power generated by the second driving source 81a is transmitted to the second wrist shaft 81 via, for example, a gear reduction mechanism. Accordingly, the second end effector 80 is rotatable, independently of the first end effector 60, about the third rotational axis L3 extending in the vertical direction. The second driving source 81a is provided with an unshown second rotational position detector that is configured as, for example, an encoder. The rotational position of the second end effector 80 can be detected by the second rotational position detector.

(Arrangement of the First Blade Member 70 and the Second Blade Member 90)

The first lifting/lowering air cylinder 63 and the second lifting/lowering air cylinder 83 can be driven by the robot controller 38 independently of each other. Accordingly, the arrangement of the first blade member 70 and the second blade member 90 relative to each other in the vertical direction is suitably switchable among four arrangement modes.

Specifically, the arrangement is suitably switchable among the following arrangement modes: an arrangement mode in which the first blade member 70 is at the lowermost position within its movable range, and the second blade member 90 is at the uppermost position within its movable range (i.e., an arrangement mode with a minimum pitch); an arrangement mode in which the first blade member 70 is at the uppermost position within its movable range, and the second blade member 90 is at the lowermost position within its movable range (i.e., an arrangement mode with a maximum pitch); an arrangement mode in which the first blade member 70 is at the lowermost position within its movable range, and the second blade member 90 is at the lowermost position within its movable range (i.e., an arrangement mode with a lower intermediate pitch); and an arrangement mode in which the first blade member 70 is at the uppermost position within its movable range, and the second blade member 90 is at the uppermost position within its movable range (i.e., an arrangement mode with an upper intermediate pitch).

As described above, the first lifting/lowering piston 64 is directed downward, and the second lifting/lowering piston 84 is directed upward. Therefore, even though the elongated air cylinders are used, the minimum distance (minimum pitch) between the first blade member 70 and the second blade member 90 in the vertical direction can be made small as shown in FIG. 3.

(Structure for Gripping the Semiconductor Wafer W)

Figure 4:
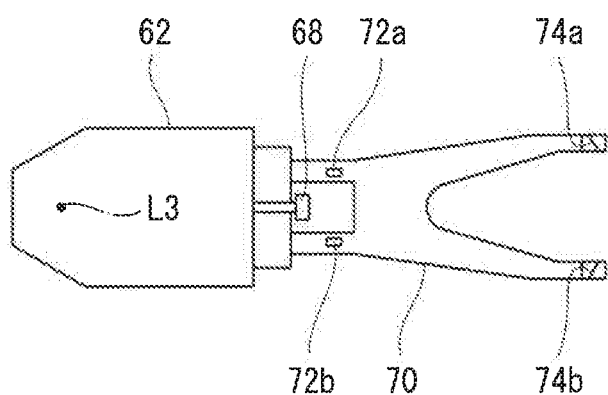
FIG. 4 is a plan view of the first end effector of the robot, the teaching of which is performed by the teaching method according to the embodiment of the present invention.

FIG. 4 is a plan view of the first end effector of the robot, the teaching of which is performed by the teaching method according to the present embodiment. As shown in FIG. 4, the first blade member 70 includes two branched distal end portions such that the first blade member 70 is in a Y shape when seen in a plan view. A pair of first bottom surface supports 72a and 72b configured to support the bottom surface of the semiconductor wafer W is provided on the upper surface of the proximal end portion of the Y-shaped body. A pair of first fixed gripping portions 74a and 74b configured to contact the edge portion of the semiconductor wafer W is provided on the upper surfaces of the two distal end portions of the Y-shaped body, such that the first fixed gripping portions 74a and 74b protrude from the upper surfaces of the two distal end portions, respectively.

The first fixed gripping portions 74a and 74b grip the semiconductor wafer W in cooperation with the aforementioned first movable gripping portion 68 in a direction connecting between the proximal end portion and the distal end portions. It should be noted that the second blade member 90 is configured in the same manner as the first blade member 70. Therefore, the description of second bottom surface supports 92a and 92b and second fixed gripping portions 94a and 94b of the second blade member 90 is omitted herein.

The first pressing air cylinder 66 and the second pressing air cylinder 86 can be driven by the robot controller 38 independently of each other. That is, the first end effector 60 and the second end effector 80 can perform an operation of gripping the semiconductor wafer W independently of each other. Also, according to the above-described configuration, the first blade member 70, the first movable gripping portion 68, etc., are lifted/lowered in conjunction with lifting/lowering of the first lifting/lowering air cylinder 63, and independently of this, the second blade member 90, the second movable gripping portion 88, etc., are lifted/lowered in conjunction with lifting/lowering of the second lifting/lowering air cylinder 83.

Figure 5A:
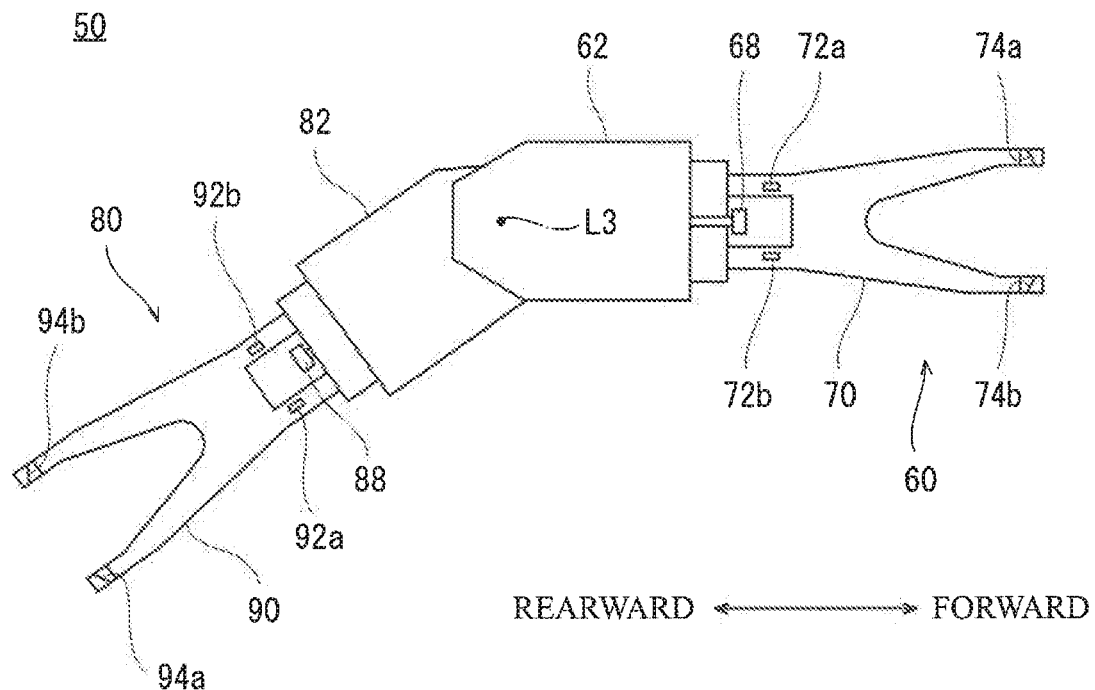
FIG. 5A is a plan view illustrating that the robot, the teaching of which is performed by the teaching method according to the embodiment of the present invention, is in such a state that only the first end effector is ready to move into a wafer accommodating apparatus.
Figure 5B:
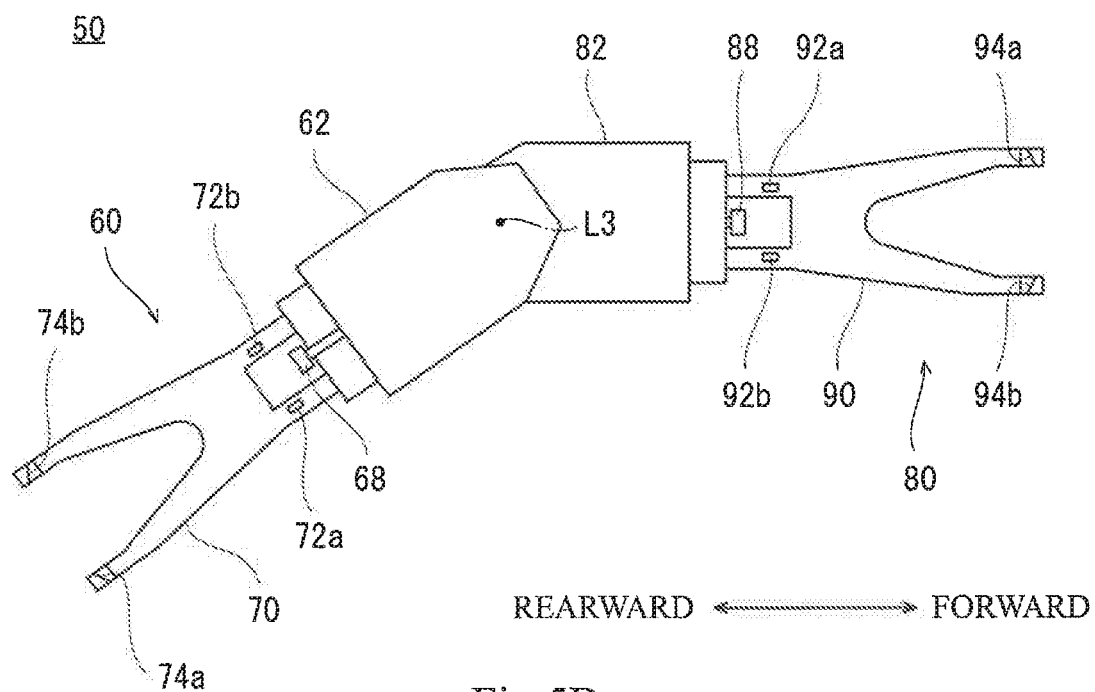
FIG. 5B is a plan view illustrating that the robot, the teaching of which is performed by the teaching method according to the embodiment of the present invention, is in such a state that only the second end effector is ready to move into the wafer accommodating apparatus.

FIG. 5A is a plan view illustrating that the robot, the teaching of which is performed by the teaching method according to the present embodiment, is in such a state that only the first end effector is ready to move into a wafer accommodating apparatus. FIG. 5B is a plan view illustrating that the robot is in such a state that only the second end effector is ready to move into the wafer accommodating apparatus. The end effector 50 is configured such that the operation state thereof is switchable between a first operation state and a second operation state. The first operation state is a state where, as shown in FIG. 1, the first end effector 60 and the second end effector 80 are arranged such that they overlap when seen in the vertical direction. The second operation state is a state where, as shown in FIG. 5A and FIG. 5B, the first end effector 60 and the second end effector 80 are arranged such that they do not overlap when seen in the vertical direction and only one of the first end effector 60 and the second end effector 80 is ready to move into the wafer accommodating apparatus, such as a FOUP.

In the second operation state, as shown in FIG. 5A, the second end effector 80 can be retreated to a non-operation position while keeping the first end effector 60 at an operation position. Alternatively, as shown in FIG. 5B, the first end effector 60 can be retreated to the non-operation position while keeping the second end effector 80 at the operation position. The "operation position" herein is the position of one of the first end effector 60 and the second end effector 80 when the one end effector is placed ready to move into the wafer accommodating apparatus, such as a FOUP. The "non-operation position" herein is, when one of the first end effector 60 and the second end effector 80 is placed at the operation position, the position of the other end effector that has been retreated such that carrying the semiconductor wafer W into/out of the wafer accommodating apparatus by the one end effector is not hindered by the other end effector. It should be noted that, when seen in a plan view, the first end effector 60 and the second end effector 80 overlap at least partly (i.e., the first end effector 60 and the second end effector 80 overlap at least on the third rotational axis L3 and in the vicinity thereof).

(Robot Controller 38)

The robot controller 38 controls the robotic arm 40, the first end effector 60, the second end effector 80, the first driving source 61a, the second driving source 81a, and a storage unit that is described below. The configuration of the robot controller 38 is not particularly limited. The robot controller 38 may be configured such that the robot controller 38 is realized as a result of a known processor (e.g., a CPU) operating in accordance with a program stored in the storage unit (e.g., a memory). The storage unit stores: rotational position information about the first end effector 60 based on outputs from the first rotational position detector; and rotational position information about the second end effector 80 based on outputs from the second rotational position detector.

It should be noted that the rotational position information about the first end effector 60 and the rotational position information about the second end effector 80 may be stored in a storage unit that is provided inside the robot controller 38 and that is different from the aforementioned memory, or may be stored in a storage unit provided separately from the robot controller 38.

(One Example of Carrying-In and Carrying-Out of the Semiconductor Wafer W)

Hereinafter, one example of operations are described, in which the robot controller 38 performs control of operating the robotic arm 40 and the end effector 50 to receive a processed semiconductor wafer W from an upper shelf of the wafer accommodating apparatus, and to place another processed semiconductor wafer W onto a lower shelf of the wafer accommodating apparatus.

First, the first end effector 60 is rendered holding no semiconductor wafer W, and the second end effector 80 is rendered holding a processed semiconductor wafer W.

Next, the robotic arm 40 is driven to move the first blade member 70 and the second blade member 90 into between the upper and lower shelves of the wafer accommodating apparatus. At the time, the first blade member 70 and the second blade member 90 are moved into the wafer accommodating apparatus until the fixed gripping portions 74 protruding from the respective distal end portions of the first blade member 70 reach positions that are slightly beyond the distal-side edge portion of a processed semiconductor wafer W that is placed on the upper shelf of the wafer accommodating apparatus (i.e., until the fixed gripping portions 74 reach the back side of the wafer accommodating apparatus).

Further, the first blade member 70 is lifted, with the first movable gripping portion 68 moved rearward to a non-gripping position, thereby receiving the processed semiconductor wafer W from the upper shelf of the wafer accommodating apparatus by the first blade member 70. At the time, since the first fixed gripping portions 74 are positioned slightly beyond the distal-side edge portion of the semiconductor wafer W placed on the upper shelf of the wafer accommodating apparatus, the semiconductor wafer W does not come into contact with the upper ends of the first fixed gripping portions 74 from above.

Then, by moving the first movable gripping portion 68 forward, the processed semiconductor wafer W placed on the upper shelf of the wafer accommodating apparatus can be gripped and held by the first movable gripping portion 68 and the first fixed gripping portions 74. In this manner, the operation of receiving the semiconductor wafer W by the first end effector 60 is completed.

Next, concurrently with the above-described operation of lifting the first blade member 70, or after the lifting operation is completed, the first end effector 60 and the second end effector 80 are moved slightly rearward, and thereby the processed semiconductor wafer W held by the second blade member 90 is positioned above the wafer placing position of the lower shelf of the wafer accommodating apparatus.

Further, the second movable gripping portion 88 is moved rearward to a non-gripping position.

Then, by lowering the second blade member 90, the processed semiconductor wafer W held by the second blade member 90 is placed onto the lower shelf of the wafer accommodating apparatus. In this manner, the operation of placing the semiconductor wafer W by the second end effector 80 is completed.

Lastly, the robotic arm 40 is driven to move the first end effector 60 and the second end effector 80 rearward, thereby removing the first end effector 60 and the second end effector 80 out of the wafer accommodating apparatus.

As described above, since the timing of receiving the processed semiconductor wafer W from the upper shelf of the wafer accommodating apparatus is shifted from the timing of placing the processed semiconductor wafer W onto the lower shelf of the wafer accommodating apparatus, the first fixed gripping portions 74 can be positioned slightly beyond the distal-side edge portion of the semiconductor wafer W placed on the upper shelf of the wafer accommodating apparatus so that the semiconductor wafer W will not come into contact with the upper ends of the first fixed gripping portions 74 from above. This makes it possible to reduce a time required for transferring the semiconductor wafer W, and consequently reduce the takt time, regardless of what kind of wafer holding method is adopted for holding the semiconductor wafer W by the end effector.

(Method of Teaching the Robot)

Hereinafter, one example of a method of teaching the robot 10 having the above-described configuration is described. In order to perform the operation of transferring a semiconductor wafer W by the robot 10, the robot 10 needs to store, in its storage unit, information such as a position at which the semiconductor wafer W to be transferred is present and a position onto which the semiconductor wafer W held by the end effector 50 is to be placed. Causing the robot 10 to store these positions in the storage unit is called teaching. In the description herein, such a stored position, i.e., a taught position, is referred to as a teaching point.

For example, a plurality of teaching points may be stored in the storage unit of the robot controller 38 (or in the storage unit of, for example, an externally connected general-purpose computer), and the robot 10 can be controlled to transfer the semiconductor wafer W based on a program that is prestored in one of the plurality of storage units.

It should be noted that, in practice, each teaching point is stored in the robot controller 38 as rotational position information that is based on an output from a rotational position detector when the first end effector 60 or the second end effector 80 is positioned at the teaching point, the rotational position detector being configured to detect rotational positions of the respective driving sources (i.e., the first turning driving source 21, the second turning driving source 22, the third turning driving source 23, the first driving source 61a, and the second driving source 81a). It should be noted that, alternatively, the rotational position information may be, for example, output values from encoders, or may be information relating to the output values from the encoders (e.g., joint rotational position information about each of joint axes driven by the respective driving sources).

Figure 6:
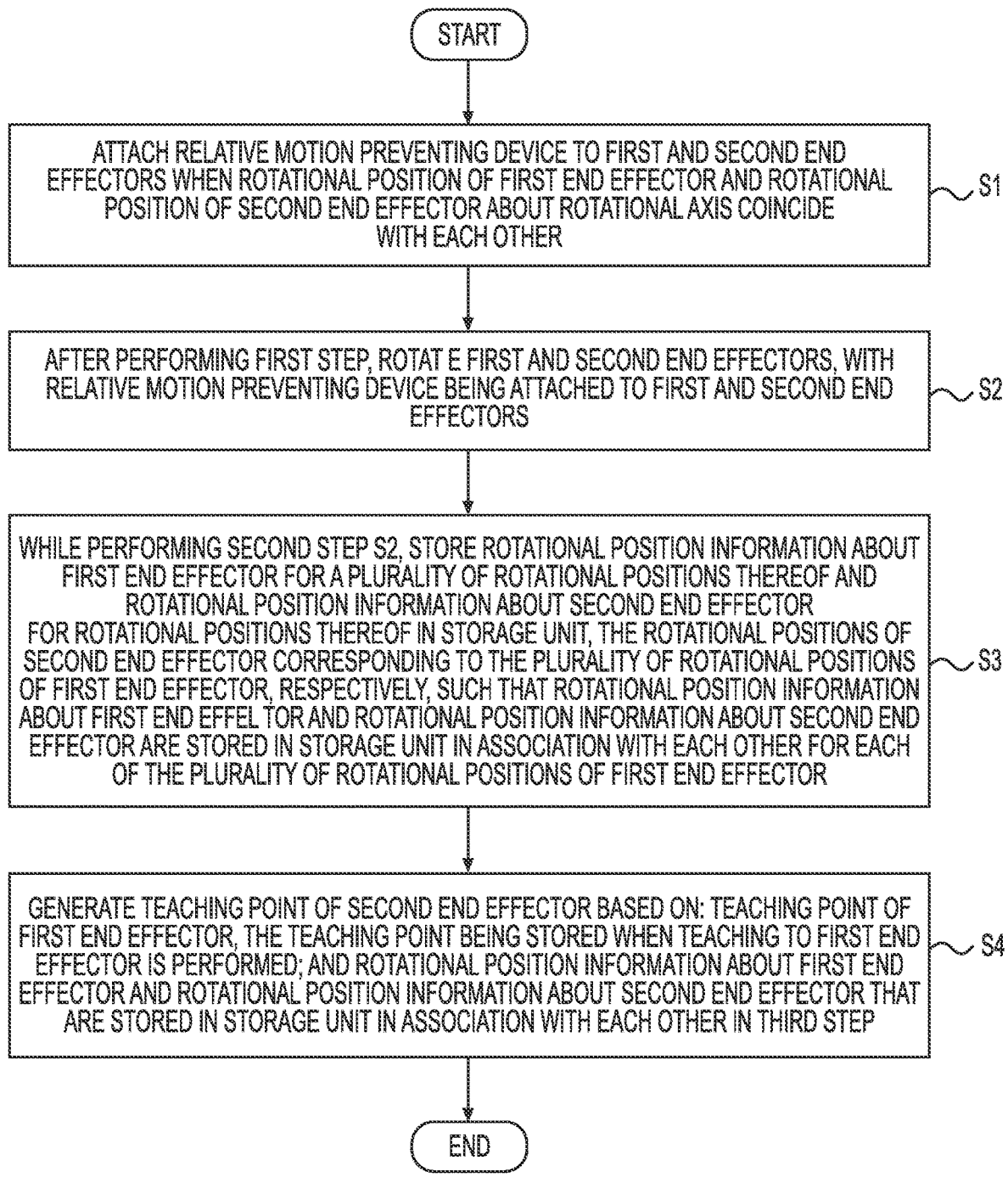
FIG. 6 is a flowchart of the teaching method according to the embodiment of the present invention.

FIG. 6 is a flowchart of the teaching method according to the present embodiment. As shown in FIG. 6, the teaching method according to the present embodiment includes first to fourth steps S1 to S4.

Figure 7:
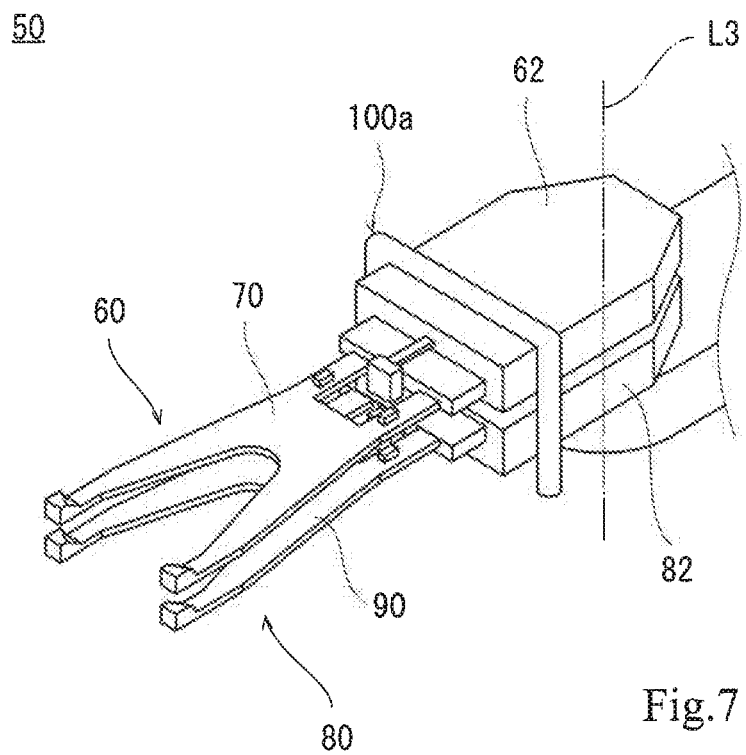
FIG. 7 is a perspective view of the end effectors and the vicinity thereof when a relative motion preventing device is attached to the end effectors in a first step of the teaching method according to the embodiment of the present invention.

First, the first step S1 is performed, which is a step of, in a state where the rotational position of the first end effector 60 and the rotational position of the second end effector 80 about the third rotational axis L3 (the rotational axis) coincide with each other, attaching a relative motion preventing device 100a to the first end effector 60 and the second end effector 80 as shown in FIG. 7, the relative motion preventing device 100a preventing the first end effector 60 and the second end effector 80 from moving relative to each other. FIG. 7 is a perspective view of the end effectors and the vicinity thereof when the relative motion preventing device is attached to the end effectors in the first step of the teaching method according to the present embodiment.

In the present embodiment, the first end effector 60 and the second end effector 80 have the same contour when seen in a plan view. Accordingly, as a result of the relative motion preventing device 100a being attached to the first end effector 60 and the second end effector 80 as described above, the first end effector 60 and the second end effector 80 overlap and the second end effector 80 cannot be seen in a plan view.

The relative motion preventing device 100a used in the present embodiment is configured to hold the first end effector 60 and the second end effector 80 in a sandwiching manner from one side and the other side with respect to the third rotational axis L3. Specifically, the relative motion preventing device 100a includes a first portion, a second portion, and a third portion. In a state where the rotational position of the first end effector 60 and the rotational position of the second end effector 80 coincide with each other, when the relative motion preventing device 100a is attached to the first end effector 60 and the second end effector 80, the first portion extends in the vertical direction, and contacts one side surface of each end effector (i.e., the side surface positioned at the front side in FIG. 7), the one side surface extending in a direction that connects between the proximal end and the distal end of the first end effector base 62; the second portion extends in the vertical direction, and contacts the other side surface of each end effector (i.e., the side surface positioned at the back side in FIG. 7); and the third portion extends in the width direction of the first end effector base 62 in a manner to connect between the first portion and the second portion, and contacts the upper surface of the first end effector base 62.

Next, after the first step S1, the second step S2 is performed, in which the robot controller 38 rotates the first end effector 60 and the second end effector 80, with the relative motion preventing device 100a being attached to the first end effector 60 and the second end effector 80. At the time, preferably, the first end effector 60 and the second end effector 80 are rotated about the third rotational axis L3 to a limit position in a positive direction and to a limit position in a negative direction (i.e., in a plan view, the end effectors are rotated in the clockwise direction to the limit position to which the end effectors are rotatable and in the counterclockwise direction to the limit position to which the end effectors are rotatable).

Further, while performing the second step S2, the third step S3 is performed, which is a step of storing rotational position information about the first end effector 60 for a plurality of rotational positions thereof and rotational position information about the second end effector 80 for rotational positions thereof in the storage unit, the rotational positions of the second end effector 80 corresponding to the plurality of rotational positions of the first end effector 60, respectively, such that the rotational position information about the first end effector 60 and the rotational position information about the second end effector 80 are stored in the storage unit in association with each other for each of the plurality of rotational positions of the first end effector 60.

Figure 8A:
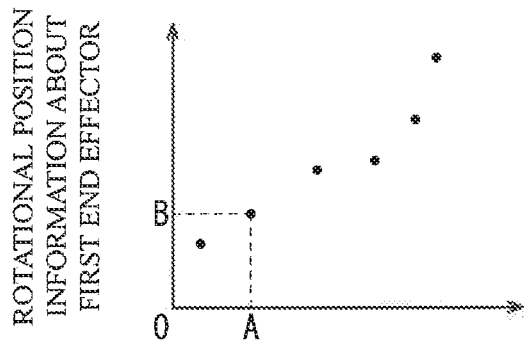
FIG. 8A shows one example of information stored in a storage unit in a third step of the teaching method according to the embodiment of the present invention.

FIG. 8A shows one example of information stored in the storage unit in the third step of the teaching method according to the present embodiment. In FIG. 8A, the vertical axis indicates the rotational position information about the first end effector, and the horizontal axis indicates the rotational position information about the second end effector. As shown in FIG. 8A, in the present embodiment, six sets of the rotational position information are stored in the storage unit. Here, a set of the rotational position information may be stored in the storage unit each time the first end effector 60 and the second end effector 80 are rotated about the third rotational axis L3, or a set of the rotational position information may be stored in the storage unit for each signal processing cycle time of the robot controller 38.

Figure 8B:
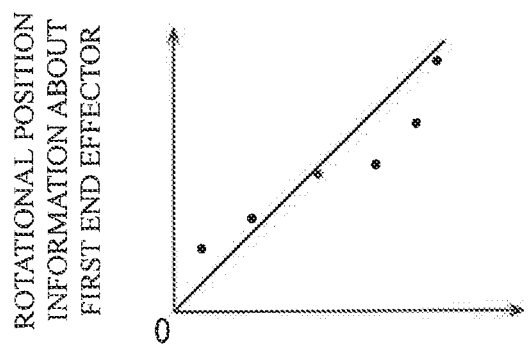
FIG. 8B shows the information stored in the storage unit in the third step of the teaching method according to the embodiment of the present invention and a straight line derived from an approximation equation created based on the information.
Figure 8C:
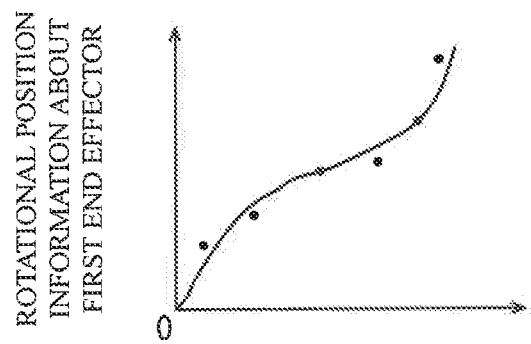
FIG. 8C shows the information stored in the storage unit in the third step of the teaching method according to the embodiment of the present invention and a curve derived from the approximation equation created based on the information.

Alternatively, as shown in FIG. 8B and FIG. 8C, the storage unit may store therein an approximation equation (or function) for deriving, from a rotational position of the first end effector 60, a corresponding rotational position of the second end effector 80. The approximation equation (or function) is created based on the rotational position information about the first end effector 60 and the rotational position information about the second end effector 80 that are stored in the storage unit in association with each other in the third step S3. FIG. 8B shows the information stored in the storage unit in the third step and a straight line derived from the approximation equation created based on the information. FIG. 8C shows the information stored in the storage unit in the third step and a curve derived from the approximation equation created based on the information.

Lastly, the fourth step S4 is performed, which is a step of generating a teaching point of the second end effector 80 based on: a teaching point of the first end effector 60, the teaching point being stored when teaching of the first end effector 60 is performed; and the rotational position information about the first end effector 60 and the rotational position information about the second end effector 80 that are stored in the storage unit in association with each other in the third step S3.

For example, assume that sets of rotational position information about the first end effector 60 and corresponding rotational position information about the second end effector 80 that are stored in the storage unit in the third step S3 are plotted as shown in FIG. 8A.

Further assume that particular teaching of the first end effector 60 has been performed. In the teaching, if the rotational position (or the aforementioned rotational position information) of the first end effector 60 about the third rotational axis L3 is B, then in order to position the second end effector 80 at the teaching point of the first end effector 60, it is necessary not only to correct the distance in the vertical direction, but also to correct the rotational position of the second end effector 80 about the third rotational axis L3 to A based on FIG. 8A. (It should be noted that there is a case where A coincides with B.)

(Advantageous Effects)

In the teaching method according to the present embodiment, when a teaching point of the first end effector 60 is used also for operating the second end effector 80, the rotational position information about the second end effector 80 is corrected based on the information that is stored in the storage unit in the third step S3, and thereby the rotational position of the first end effector 60 and the rotational position of the second end effector 80 can be prevented from shifting from each other. As a result, even in a case where a teaching point of the first end effector 60 is used also for operating the second end effector 80, the second end effector 80 can be operated with high precision.

In the present embodiment, a teaching point of the second end effector 80 is generated based on a teaching point of the first end effector 60 by using the approximation equation, which is an equation for deriving, from a rotational position of the first end effector 60, a corresponding rotational position of the second end effector 80. The generated teaching point of the second end effector 80 is stored in the storage unit. In this manner, information can be interpolated, the information being present between a plurality of pieces of rotational position information about the first end effector 60 and a plurality of pieces of rotational position information about the second end effector 80, which are stored in the storage unit in the third step S3 such that the rotational position information about the first end effector 60 and the rotational position information about the second end effector 80 are stored in the storage unit in association with each other for each of a plurality of rotational positions.

The relative motion preventing device 100a according to the present embodiment is configured to hold the first end effector 60 and the second end effector 80 in a sandwiching manner from one side and the other side with respect to the third rotational axis L3. This configuration makes it possible, with a simple structure, to assuredly prevent the first end effector 60 and the second end effector 80 from moving relative to each other.

(Variations)

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

Figure 9:
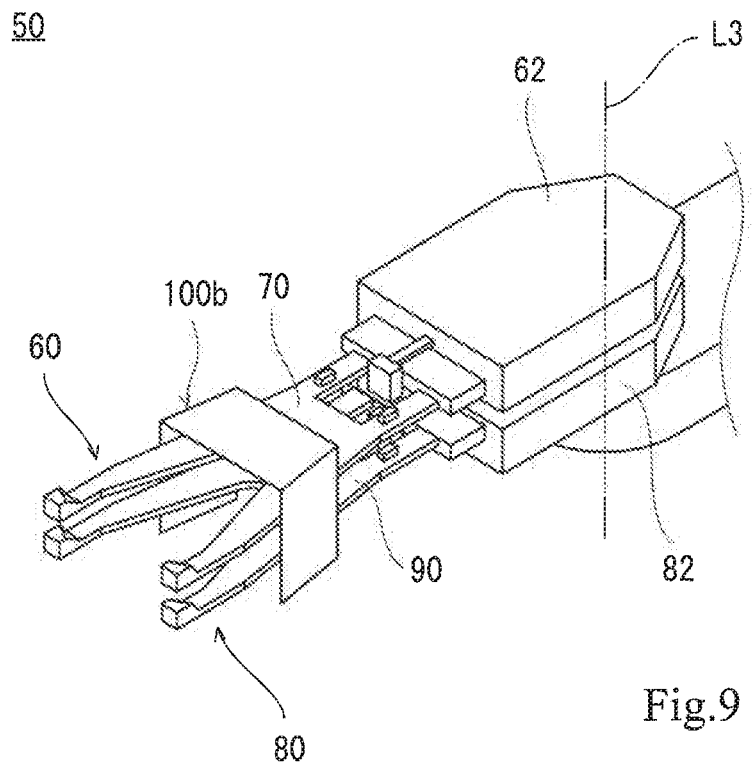
FIG. 9 is a perspective view of the end effectors and the vicinity thereof, showing a first variation of the relative motion preventing device, which is attached to the end effectors in the first step of the teaching method according to the embodiment of the present invention.
Figure 10:
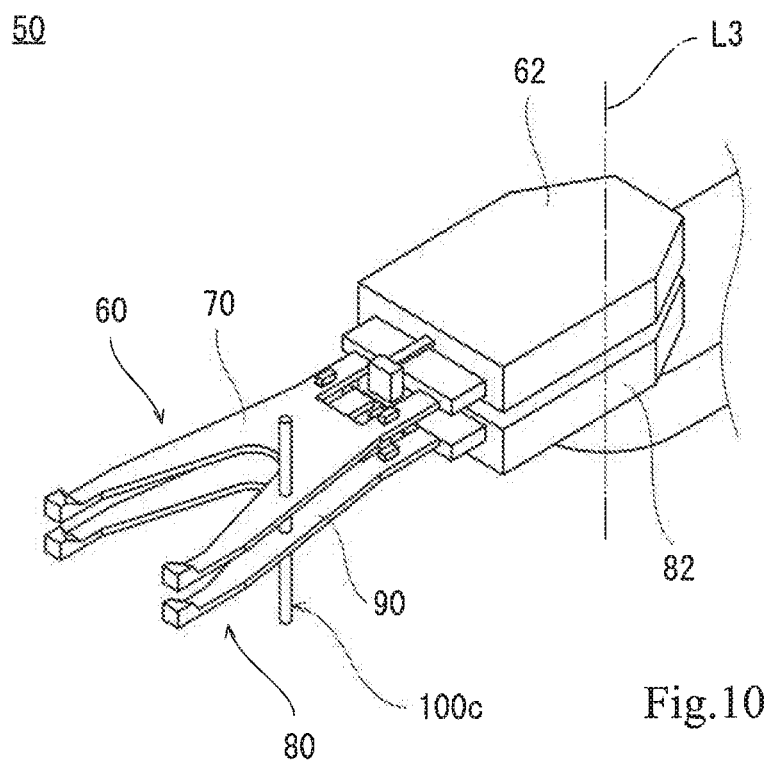
FIG. 10 is a perspective view of the end effectors and the vicinity thereof, showing a second variation of the relative motion preventing device, which is attached to the end effectors in the first step of the teaching method according to the embodiment of the present invention.

The above embodiment describes a case where the relative motion preventing device 100 used in the first step S1 has the structure shown in FIG. 7. However, the structure of the relative motion preventing device 100 is not limited the one shown in FIG. 7. The relative motion preventing device 100 may have an alternative structure as shown in, for example, FIG. 9 or FIG. 10. FIG. 9 is a perspective view of the end effectors and the vicinity thereof, showing a first variation of the relative motion preventing device, which is attached to the end effectors in the first step of the teaching method according to the present embodiment. FIG. 10 is a perspective view of the end effectors and the vicinity thereof, showing a second variation of the relative motion preventing device.

As shown in FIG. 9, a relative motion preventing device 100b according to the first variation is the same as the relative motion preventing device 100a according to the above-described embodiment in terms of being configured to hold the first end effector 60 and the second end effector 80 in a sandwiching manner from one side and the other side with respect to the third rotational axis L3.

However, the relative motion preventing device 100b according to the first variation is different from the relative motion preventing device 100a according to the above-described embodiment in the following points. The relative motion preventing device 100b includes a plate-shaped first portion, a plate-shaped second portion, and a plate-shaped third portion. In a state where the rotational position of the first end effector 60 and the rotational position of the second end effector 80 coincide with each other, when the relative motion preventing device 100b is attached to the first end effector 60 and the second end effector 80, the first portion extends in the vertical direction, and contacts one end surface of each end effector (i.e., the end surface positioned at the front side in FIG. 9), the one end surface extending in a direction that connects between the proximal end and the distal end of the first blade member 70; the second portion extends in the vertical direction, and contacts the other end surface of each end effector (i.e., the end surface positioned at the back side in FIG. 9); and the third portion extends in the width direction of the first blade member 70 in a manner to connect between the first portion and the second portion, and contacts the upper surface of the first blade member 70. This structure may be adopted to prevent the first end effector 60 and the second end effector 80 from moving relative to each other.

It should be noted that the relative motion preventing device 100b according to the first variation holds the first end effector 60 and the second end effector 80 in a sandwiching manner at a position that is farther from the third rotational axis L3 than the position where the relative motion preventing device 100a according to the above-described embodiment holds the first end effector 60 and the second end effector 80 in a sandwiching manner. By holding the first end effector 60 and the second end effector 80 in a sandwiching manner at the farther position, the relative motion preventing device 100b according to the first variation makes it possible to bring the direction connecting between the proximal end and the distal end of the first end effector 60 into more precise coincidence with the direction connecting between the proximal end and the distal end of the second end effector 80.

As shown in FIG. 10, a relative motion preventing device 100c according to the second variation is a rod-shaped member to be inserted through holes that are formed through the first blade member 70 and the second blade member 90 in the vertical direction. In a state where the rotational position of the first blade member 70 and the rotational position of the second blade member 90 coincide with each other, when seen in a plan view, the position of the hole formed in the first blade member 70 and the position of the hole formed in the second blade member 90 coincide with each other. This structure may be adopted to prevent the first end effector 60 and the second end effector 80 from moving relative to each other.

The above embodiment describes a case where the first end effector 60 and the second end effector 80 have the same contour when seen in a plan view. However, the contours of the first and second end effectors are not thus limited. The contour of the first end effector 60 and the contour of the second end effector 80 may be different from each other. In such a case, for example, the shape of the relative motion preventing device 100a may be determined in consideration of the contours of the first end effector 60 and the second end effector 80, such that the direction connecting between the proximal end and the distal end of the first end effector 60 and the direction connecting between the proximal end and the distal end of the second end effector 80 coincide with each other.

The above embodiment describes a case where the first end effector 60 is disposed at the upper side, and the second end effector 80 is disposed at the lower side. Alternatively, the second end effector 80 may be disposed at the upper side, and the first end effector 60 may be disposed at the lower side.

The above embodiment describes a case where, in the second step S2, the robot controller 38 rotates the first end effector 60 and the second end effector 80. However, the embodiment is not thus limited. Specifically, in the second step S2, in a state where no driving force is generated by the first driving source 61a for driving the rotation of the first end effector 60 and no driving force is generated by the second driving source 81a for driving the rotation of the second end effector 80 while no brake is applied to the first end effector 60 and the second end effector 80, an operator may manually rotate the first end effector 60 and the second end effector 80.

Alternatively, in the second step S2, in a state where no driving force is generated by the second driving source 81a and no brake is applied to the second end effector 80, the rotation of the first end effector 60 may be driven by the driving force from only the first driving source 61a, and thereby the second end effector 80 may also be rotated, or in a state where no driving force is generated by the first driving source 61a and no brake is applied to the first end effector 60, the rotation of the second end effector 80 may be driven by the driving force from only the second driving source 81a, and thereby the first end effector 60 may also be rotated.

The above embodiment describes a case where, in the third step S3, six sets of the rotational position information about the first end effector 60 and the rotational position information about the second end effector 80 are stored in the storage unit. However, the embodiment is not thus limited. As one example, in the second step S2, each of the first end effector 60 and the second end effector 80 may be moved to three points that are a lower limit position, an upper limit position, and a middle position between the lower limit position and the upper limit position, and based thereon, three sets of rotational position information may be stored in the storage unit. As another example, one set, two sets, four sets, five sets, or seven or more sets of rotational position information may be stored in the storage unit.

The above embodiment describes a case where the robot 10 is a transfer robot for holding and transferring a semiconductor wafer W in a clean room that is a semiconductor manufacturing site. However, the embodiment is not thus limited. Specifically, the robot 10 may be a different type of robot that performs work in a work site, such as a food manufacturing site or an automobile manufacturing site, so long as the robot 10 is configured to include, for example, the first end effector 60 and the second end effector 80, which are rotatable about the same third rotational axis L3 independently of each other.

- 10 robot
- 20 lifting/lowering driving source
- 21 first turning driving source
- 22 second turning driving source
- 23 third turning driving source
- 30 base
- 32 lifting/lowering shaft
- 38 robot controller
- 40 robotic arm
- 41 first link
- 42 second link
- 50 end effector
- 60 first end effector
- 61 first wrist shaft
- 61a first driving source
- 62 first end effector base
- 63 first lifting/lowering air cylinder
- 64 first lifting/lowering piston
- 65 first lifting/lowering member
- 66 first pressing air cylinder
- 67 first pressing piston
- 68 first movable gripping portion
- 70 first blade member
- 72a/72b first bottom surface supports
- 74a/74b first fixed gripping portions
- 80 second end effector
- 81 second wrist shaft
- 81a second driving source
- 82 second end effector base
- 83 second lifting/lowering air cylinder
- 84 second lifting/lowering piston
- 85 second lifting/lowering member
- 86 second pressing air cylinder
- 87 second pressing piston
- 88 second movable gripping portion
- 90 second blade member
- 92a/92b second bottom surface supports
- 94a/94b second fixed gripping portions
- 100/100a/100b/100c relative motion preventing device
- L rotational axis
- W semiconductor wafer

The invention claimed is:

1. A method of teaching a robot,
the robot including:
   a robotic arm;
   a first end effector and a second end effector that are mounted to a wrist of the robotic arm, the first end effector and the second end effector being rotatable about a same rotational axis independently of each other;
   a first driving motor and a second driving motor, the first driving motor being configured to rotate the first end effector about the rotational axis, the second driving motor being configured to rotate the second end effector about the rotational axis;
   a first rotational position sensor and a second rotational position sensor, the first rotational position sensor being configured to detect a rotational position of the first end effector, the second rotational position sensor being configured to detect a rotational position of the second end effector;
   a memory configured to store rotational position information about the first end effector and rotational position information about the second end effector, the rotational position information about the first end effector being based on an output from the first rotational position sensor, the rotational position information about the second end effector being based on an output from the second rotational position sensor; and
   a robot controller configured to control the robotic arm, the first end effector, the second end effector, the first driving motor the second driving motor, and the memory,
the method comprising:
   a first step of, attaching a relative motion preventing device together to both the first end effector and the second end effector in a state where the rotational position of the first end effector and the rotational position of the second end effector about the rotational axis coincide with each other, the relative motion preventing device preventing the first end effector and the second end effector from moving relative to each other;
   a second step of rotating the first end effector and the second end effector after the first step, with the relative motion preventing device being attached to the first end effector and the second end effector;
   a third step of, while performing the second step, storing rotational position information about the first end effector for a plurality of rotational positions of the first end effector and rotational position information about the second end effector for rotational positions of the second end effector in the memory, the rotational positions of the second end effector corresponding to the plurality of rotational positions of the first end effector, respectively, such that the rotational position information about the first end effector and the rotational position information about the second end effector are stored in the memory in association with each other for each of the plurality of rotational positions of the first end effector; and a fourth step of generating a teaching point of the second end effector based on:

a teaching point of the first end effector, the teaching point being stored when teaching of the first end effector is performed; and the rotational position information about the first end effector and the rotational position information about the second end effector that are stored in the memory in association with each other in the third step.

2. The method of teaching a robot according to claim 1, wherein:

generating the teaching point of the second end effector is performed based on the teaching point of the first end effector by using an approximation equation that is an equation for deriving, from a rotational position of the first end effector, a corresponding rotational position of the second end effector, and the approximation equation is created based on the rotational position information about the first end effector and the rotational position information about the second end effector that are stored in the memory in association with each other in the third step.

3. The method of teaching a robot according to claim 1, wherein the relative motion preventing device is configured to hold the first end effector and the second end effector in a sandwiching manner from one side and another side with respect to the rotational axis.

4. The method of teaching a robot according to claim 1, wherein the first end effector and the second end effector have a same contour when seen in a plan view.

5. The method of teaching a robot according to claim 1, wherein the robot is a transfer robot for holding and transferring a semiconductor wafer in a clean room that is a semiconductor manufacturing site.

\* \* \* \* \*